INVENTORS
JACK B. PRATT &
LOUIS SLOAN
ATTORNEYS

INVENTORS
JACK B. PRATT &
LOUIS SLOAN
BY

ATTORNEYS

Dec. 13, 1966    J. B. PRATT ETAL    3,291,311
UNDERDRAINS

Filed Jan. 30, 1964    3 Sheets-Sheet 3

INVENTORS
JACK B. PRATT &
BY    LOUIS SLOAN

ATTORNEYS

3,291,311
UNDERDRAINS
Jack B. Pratt, Millside Heights, N.J., and Louis Sloan, Philadelphia, Pa., assignors to Crane Co., Chicago, Ill., a corporation of Illinois
Filed Jan. 30, 1964, Ser. No. 341,208
5 Claims. (Cl. 210—172)

This invention relates to underdrains, and particularly to underdrains for use with tanks in which a solid substance is required to be retained while liquid is passed to the exterior of the tank. This invention has particular application in ion exchange equipment and in filters utilizing filter beds.

In an apparatus of this type, it is desirable to provide a plurality of cylindrical strainers inside the bottom of a tank, thus providing a large area of contact between the strainer material and the liquid inside the tank.

Heretofore, strainers in an underdrain system had to be mounted from the inside of a tank. Considerable difficulty and expense is involved in this type of assembly. One problem involved is the connecting of a plurality of strainers to a single output line. To solve this problem, tanks with false bottoms have been used, the strainers being mounted on the false bottom, and their output being collected in the volume of the tank below the false bottom and transmitted through a pipe at the bottom of the tank. Besides the difficulty involved in assembly of this type of apparatus, a further drawback is that with the false bottom, less tank volume can be used to contain filter bed or ion exchange resin.

In accordance with this invention there is provided an underdrain construction by which a plurality of strainers may be mounted in a tank when access to the interior of the tank is limited.

Another object of this invention is to provide an underdrain construction in which a plurality of strainers may be externally connected to a single output line.

It is a further object of this invention to provide a strainer whose cross-sectional area is small, but whose area of contact with liquid inside the tank is large, and whose rigidity and resistance to damage is maintained.

A still further object of this invention is to provide uniform distribution of flow in an underdrain system involving a plurality of strainers.

A still further object is to provide an underdrain apparatus whereby the volume of the tank may be used more effectively for containing ion exchange resin or filter bed.

Further objects and features of the invention will become apparent from the following description read in conjunction with the accompanying drawings, in which.

Figure 1:
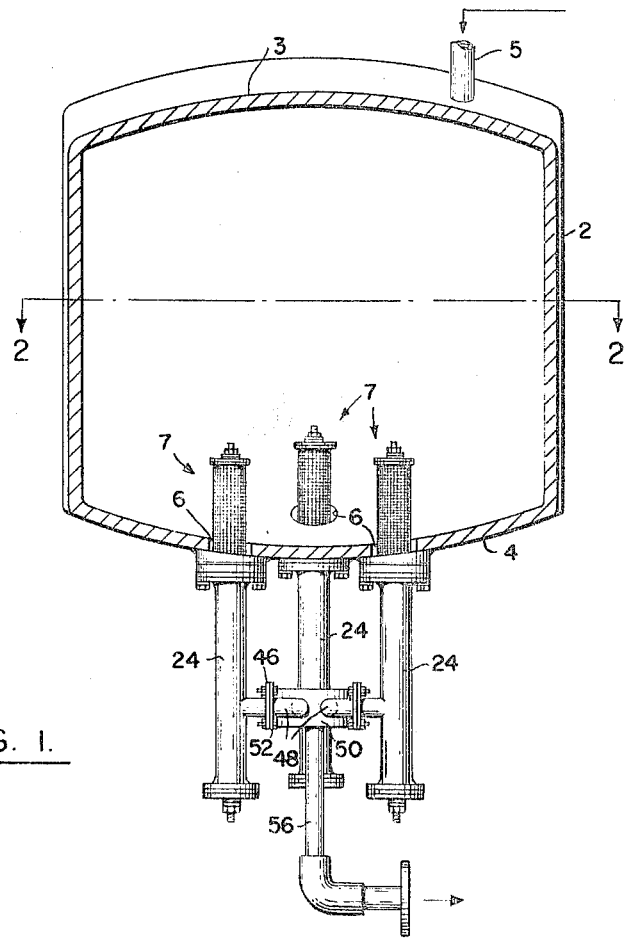
FIGURE 1 is a vertical section of a tank and underdrain apparatus in accordance with this invention.
Figure 2:
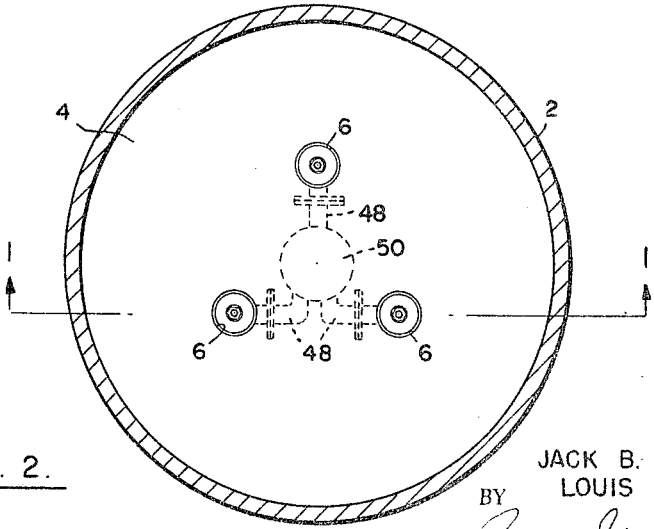
FIGURE 2 is a section taken on the plane indicated at 2—2 in FIGURE 1.

Referring to FIGURE 1, there is shown a cylindrical tank 2, closed at its top by a convex portion 3 and at its bottom by convex portion 4. Top portion 3 is provided with an inlet line 5 and bottom portion 4 is provided with three holes 6, the location of which is best shown in FIGURE 2. Three strainer assemblies 7 protrude through holes 6 into the interior of the tank 2.

Figure 3:
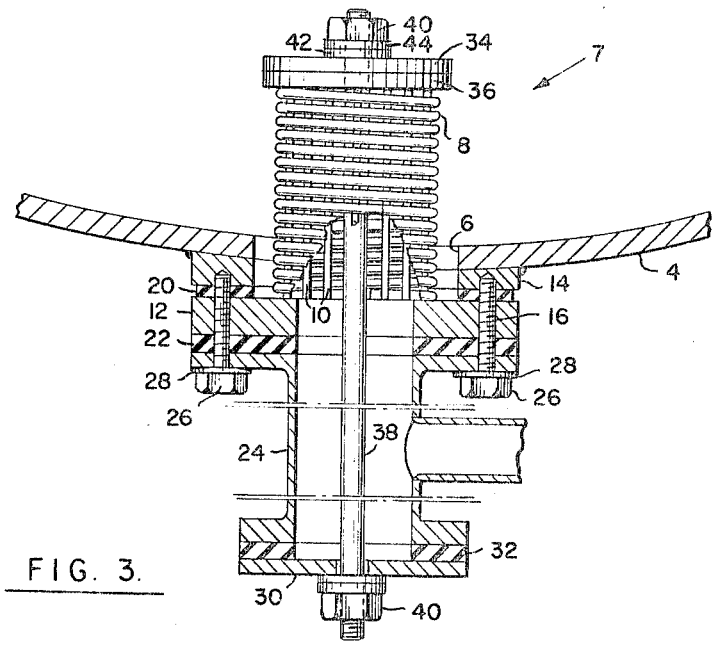
FIGURE 3 is a detailed view of a single strainer and outlet assembly.

As shown in FIGURE 3, the strainer assembly 7 comprises a strainer 8 which is desirably constructed by winding a wire in a helical configuration around supporting posts 10 to define a chamber therein. The width of the spaces between adjacent layers of wire in the strainer is such as to permit flow of fluid from the exterior to the interior of the strainer, but to retain solid particles of ion-exchange resin or filter bed material in the interior of the tank. Supporting posts 10 are welded to an annular member 12 and are arranged around the inner edge of member 12 so as to provide a means to support the wire in its helical configuration. Bottom portion 4 of tank 2 is provided with an annular pad 14 in which is secured a pair of threaded studs 16. Pad 14 is secured to bottom portion 4 of the tank by welding. The construction of pad 14 is such that its upper surface is curved to engage the curved portion 4 of the tank and its lower surface is planar. It will be apparent that other suitable tank entrance connections for the strainer nozzles may be used, such as a flange nozzle connection or a threaded coupling. Above and below member 12 there are provided annular gaskets 20 and 22, respectively. A T connection 24 is provided below and in contact with annular gasket 22 and in communication with the chamber defined within strainer 8. The entire assembly comprising annular gasket 20, member 12, gasket 22 and T connection 24 is mounted on studs 16 and tightly secured against the annular pad 14 by means of nuts 26 which are provided with rubber washers 28.

T connection 24 is closed at its lower end by a cover plate 30. Between cover plate 30 and T connection 24 there is provided an annular gasket 32.

Strainer 8 is closed at its top by a top plate 34, the diameter of which is slightly less than that of hole 6. Between strainer 8 and top plate 34 there is provided an annular gasket 36.

A hold bar 38, threaded at both ends, extends throughout the entire length of the strainer and outlet assemblies, and is provided at both ends, with nuts 40 which are tightened to clamp the entire strainer and outlet assemblies together rigidly. Metal washers 42 and rubber washers 44 are provided between nuts 40 and cover plates 34 and 30.

It will be apparent that liquid may flow only through the strainer and through the T connection since the gaskets seal any other possible path of flow.

Referring to FIGURES 1 and 2, the horizontal portion of each T connection 24 is provided with a flange 46. Lines 48, extending from a common collection box or manifold 50, communicate with the T connections 24. Lines 48 are provided with flanges 52 which engage flanges 46 and which are fastened to flanges 46 by means of bolts. The common collection box 50 is in the form of a cylindrical chamber and is provided at its bottom with an outlet line 56.

It will be apparent that any reasonable number of strainer assemblies 7 may manifolded in the aforedescribed manner and connected to a common outlet line 56. It will also be apparent that a variety of strainer constructions may be used in accordance with this invention, including the screen or multiple stacked-disc types.

Since the maximum diameter of the strainer assemblies 7 is less than the diameter of the holes 6, the entire underdrain assembly may be mounted to the tank from the outside. The cost of assembly and disassembly is thus greatly reduced.

Figure 4:
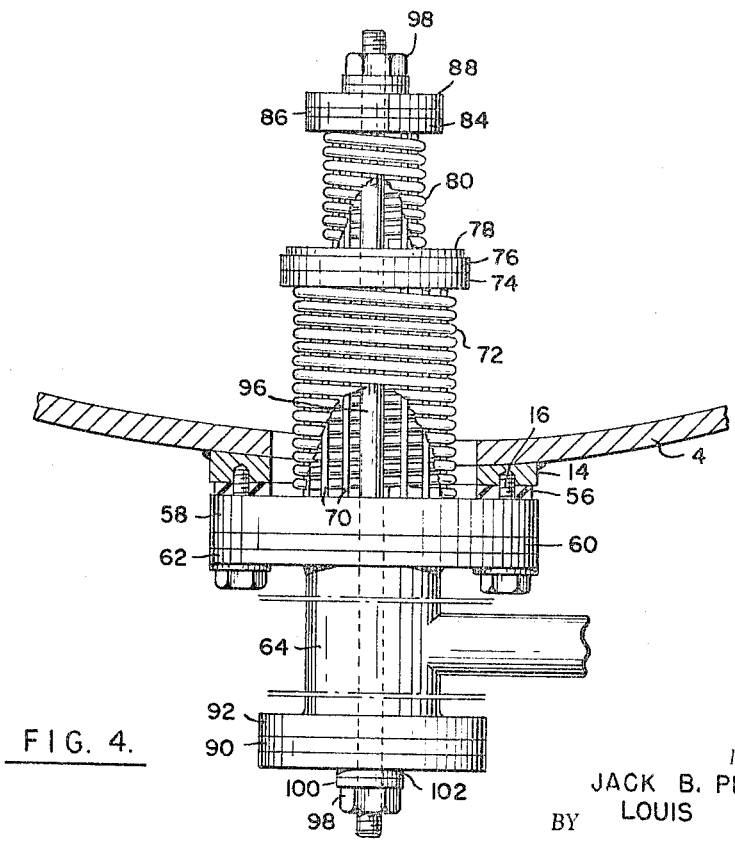
FIGURE 4 is a detailed view of an alternative strainer and outlet assembly according to this invention.

Referring to FIGURE 4, there is shown a section of a bottom portion 4 of a tank to which is welded an annular pad 14 with a pair of studs 16 threaded therein. Mounted on studs 16 is an annular gasket 56 engaging pad 14. Below and engaging gasket 56 there is an annular member 58 which is provided with holes for passage over studs 16. Below member 58 an annular gasket 60 is mounted on studs 16. Below gasket 60, there is mounted the flange 62 of T connection 64, flange 62 being provided with holes for passage over studs 16. The assembly, including gasket 56, member 58, gasket 60, and flange 62 is fastened to pad 14 by means of nuts 68 threaded on studs 16.

A plurality of vertical supporting posts 70 are welded to member 58 and are arranged so that a wire 72 may be wound around them in a helical configuration. An annular member 74 rests on vertical supporting posts 70, an annular gasket 76 rests on member 74 and an annular member 78 rests on gasket 76.

A wire 80 is wound in a helical configuration around a plurality of supporting posts 82 which are welded to member 78. An annular member 84 rests on supporting posts 82 and has an annular gasket 86 resting thereon. A top plate 88 rests on gasket 86.

An annular gasket 90 is provided below and in engagement with a flange 92 of T connection 64. A cover plate 94 is provided below gasket 90. The entire strainer and outlet assembly of FIGURE 4 is held together by means of a rod 96, threaded at each end and provided with nuts 98, metal washers 100, and rubber washers 102.

The wires 72 and 80, in conjunction with other structure, provide a pair of stacked tubular strainers having internal chambers in communication by way of the central openings in members 74, 76 and 78. These internal chambers, in turn, communicate with T connection 64 for the flow of fluid to the exterior of the tank.

This type of construction is applicable where it is desired to stack a number of strainers in a pyramid fashion in order to provide a greater area of contact with the liquid inside a resin or filter tank. In a system comprising a large number of strainer assemblies, improved distribution of flow may be obtained by providing pyramided strainers near or at the center of the tank bottom and providing strainer and outlet assemblies having only one strainer near the periphery of the tank.

The maximum diameter of the pyramid of strainers is such that the assembly may be inserted into or removed from the hole 6 provided in the tank when access to the interior of the tank is limited.

Figure 5:
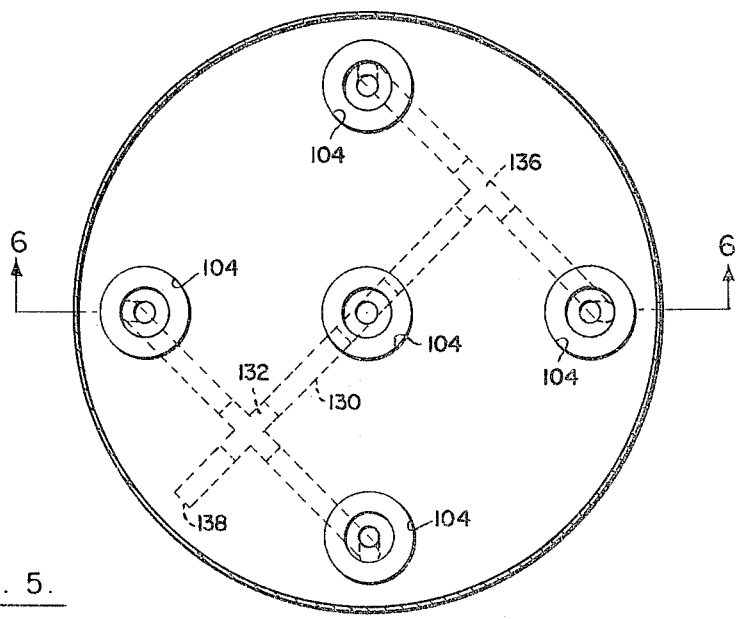
FIGURE 5 is a plan view of the bottom of a tank having an underdrain construction in accordance with an alternate form of the invention.
Figure 6:
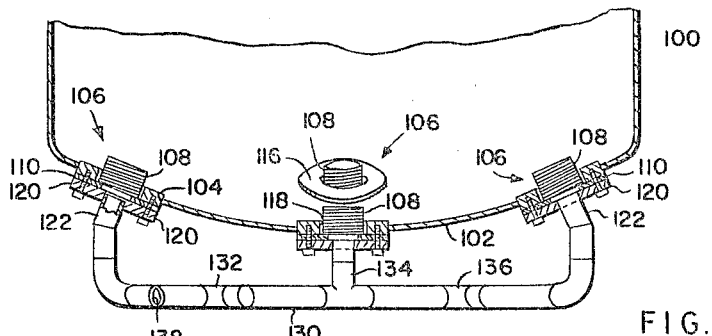
FIGURE 6 is a sectional view taken on line 6—6 of FIGURE 5.
Figure 7:
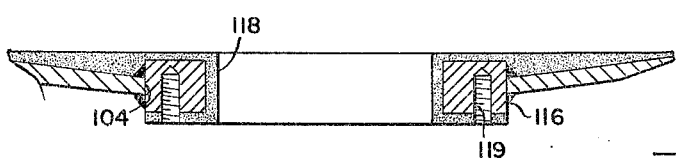
FIGURE 7 is a fragmentary view illustrating a detail.
Figure 8:
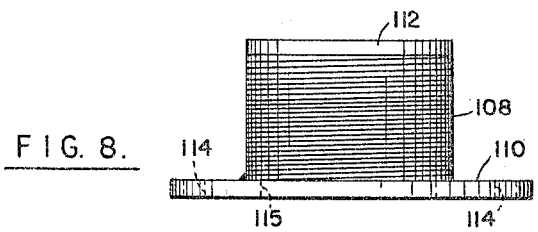
FIGURE 8 is a detailed view of an alternate form of a strainer.

FIGURES 5 to 8 illustrate an alternate embodiment of the invention. Referring to FIGURES 5 and 6, there is shown a cylindrical tank 100 having a convex bottom 102 provided with five openings 104 adapted to receive strainer assemblies 106 which project through the openings into the interior of the tank. Each strainer assembly comprises a strainer 108 which is similar to the strainer described previously except as will appear hereafter. The wire wound element is welded at the bottom to an annular flange 110 and is closed on top by welding to a metal disc 112. Flange 110 is provided with openings 114 for receiving the mounting studs when the strainer is secured to the bottom of the tank and a central opening 115 is in communication with the outlet connection. As is best shown in FIGURES 6 and 7, an annular pad 116 is welded in each of the openings 104 in the tank bottom. The tank is covered with the usual rubber lining which also covers the tank interior. A central opening 118 in the pad 116 is large enough to receive the strainer 108 with safe clearance to permit insertion and removal thereof from the exterior of the tank. Pad 116 is provided with suitable threaded holes 119 for engagement by the mounting studs for securing the strainer assembly on the tank bottom.

The assembly of the strainer assembly in the tank bottom is similar to that of the previously described embodiment and is best shown in FIGURE 6, the strainer 108 not being shown in inserted condition in FIGURE 5. In the assembled condition, the strainer flange 110 is sandwiched between pad 116 and the mating flange 120 of the outlet T connection 122 with suitable gaskets between the mating parts.

The individual parts are secured in assembled condition by means of suitable mounting studs which engage the threaded openings in pad 116. The T connection 122 communicates with the chamber within the strainer 108.

The embodiment of the invention shown in FIGURES 5 to 8 comprises a different form of manifold than that shown in FIGURES 1 and 2. Referring to FIGURES 5 and 6, the manifold arrangement shown therein comprises a manifold pipe 130 comprising a cross 132 and a pair of tees 134 and 136, the outlet being indicated at 138. Each of the five T connections 122 for the strainer assemblies is connected to this manifold pipe 130 by suitable collector lines as shown in FIGURES 5 and 6.

It will be noted that in the form of the invention shown in FIGURES 5 to 8 there is provided a flat pad which is secured in the bottom of the tank with the strainers inserted and extending into the tank on an angle. This arrangement differs from that shown in FIGURES 1 to 4 wherein the pad is formed to conform to the shape of the convex bottom whereby the strainer extends vertically. It is to be noted that in the alternate form of the invention the manifold arms are curved near the strainers to form a vertically extending portion. This is to provide a construction wherein when the manifold assembly consists of a unitary construction, it is possible to move the entire manifold system for purposes of assembly and disassembly. Another alternate manifold construction would involve attaching the collector arms to the strainer and tank by means of an elbow fitting or T with the manifold arms extending on an angle downwardly directly to the main collector header of the manifold piping with no intermediate bends. Another alternate construction is to construct the pad of substantial thickness so that it can be welded in the tank bottom with the strainer assemblies extending vertically. In this arrangment, the periphery of the pad inside the tank is spaced various distances from the inner side of the tank bottom which is convex. However, with a strainer at the center of the tank bottom, the underdrain still provides collection at the lowest point.

It is to be understood that various changes may be made in the construction and arrangement of parts without departing from the scope of the invention. Accordingly, it is not desired to be limited except as required by the following claims.

What is claimed is:

1. A tank underdrain comprising means forming a tank bottom having a plurality of openings therein, a strainer associated with each opening, means removably mounting each of said strainers on said tank bottom for ready removal from the exterior of said tank and to extend through its associated opening vertically into the interior of the tank, each of said strainers having a tubular fluid straining wall one side of which communicates with the interior of the tank and the other side of which defines an outlet passage from said tank, each strainer having a flange secured to and extending around one end of said straining wall and a plate member at the other end of said straining wall, said mounting means including a mounting pad extending around each opening fixedly secured to said tank bottom and means at each opening engaging a strainer flange and an associated mounting pad for removably securing the strainer to said tank bottom, said engaging means being accessible from the exterior of the tank for removal from its engaging position whereby said strainers may be removed and disassembled from the exterior of the tank, conduit means communicating with said outlet passages for conveying fluid from said tank, and a manifold, said conduit means being connected from each outlet passage to said manifold for delivering fluid thereto.

2. A tank underdrain according to claim 1 wherein at least one of said strainers comprises a plurality of rods mounted in circumferentially spaced parallel relation, said fluid straining wall comprising a wire wrapped in a helical configuration around and onto said rods.

3. A tank underdrain according to claim 1 wherein said tank bottom is generally dish-shaped, at least one of said strainers and openings being located in the lowest portion of said tank bottom and having its fluid straining wall extending through the opening associated therewith and spaced inwardly therefrom whereby fluid may pass from the tank into said space between said one strainer and opening and through the associated fluid straining wall.

4. A tank underdrain according to claim 3 wherein each strainer comprises a plurality of rods mounted in circumferentially spaced parallel relation, said fluid straining wall comprising a wire wrapped in a helical configuration around and onto said rods.

5. A tank underdrain comprising means forming a tank bottom having a plurality of openings therein, a strainer associated with each opening, means removably mounting said strainers on said tank bottom for ready removal from the exterior of said tank and to extend through their associated openings vertically into the interior of the tank, each of said strainers having a tubular fluid straining wall one side of which communicates with the interior of the tank and the other side of which defines an outlet passage from said tank, each strainer having an annular flange secured to one end of said straining wall and a plate member enclosing the other end of said straining wall, said mounting means including individual securing means associated with each of said annular flanges for removably securing said annular flange on the exterior of the tank bottom, said securing means being accessible from the exterior of the tank for removal from its engaging position whereby said strainers may be removed and disassembled from the exterior of the tank, conduit means communicating with said outlet passages for conveying fluid from said tank, and a manifold, said conduit means being connected from each outlet passage to said manifold for delivering fluid thereto, at least one of said strainers including a pair of tubular fluid straining members secured together in end-to-end vertically stacked relation with the upper member on the upper end of the lower member to provide two vertically extending straining locations, each of said tubular fluid strainer members comprising a plurality of rods mounted in circumferentially spaced parallel relation, and a wire wrapped in a helical configuration around and onto said rods, said upper member having a smaller diameter than said lower member.

References Cited by the Examiner
UNITED STATES PATENTS

| | | | |
|---|---|---|---|
| 417,038 | 12/1889 | Hyatt | 210—279 X |
| 1,191,741 | 7/1916 | Scull | 210—172 |
| 2,269,956 | 1/1942 | Renner | 210—497.1 X |
| 2,517,825 | 8/1950 | Ashcraft | 210—497.1 X |
| 2,643,772 | 6/1953 | Martin | 210—289 X |
| 2,742,421 | 4/1956 | McGill | 210—497.1 X |
| 2,966,269 | 12/1960 | Allen | 210—314 X |
| 3,037,633 | 6/1962 | Veitel et al. | 210—289 X |

REUBEN FRIEDMAN, *Primary Examiner.*
SAMIH N. ZAHARNA, *Examiner.*